United States Patent
Bradshaw et al.

(10) Patent No.: US 9,947,345 B2
(45) Date of Patent: *Apr. 17, 2018

(54) PROTECTING A SENSITIVE DEVICE FROM CORROSION

(71) Applicant: International Business Machines Corporation, Armonk, NY (US)

(72) Inventors: Richard Lionel Bradshaw, Tucson, AZ (US); Icko Eric Timothy Iben, Santa Clara, CA (US); Wayne Alan Mckinley, Tucson, AZ (US); Lee Curtis Randall, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/846,713

(22) Filed: Sep. 4, 2015

(65) Prior Publication Data
US 2015/0380028 A1 Dec. 31, 2015

Related U.S. Application Data

(60) Continuation of application No. 13/647,210, filed on Oct. 8, 2012, now Pat. No. 9,159,341, which is a
(Continued)

(51) Int. Cl.
*G11B 5/255* (2006.01)
*G11B 5/008* (2006.01)
(Continued)

(52) U.S. Cl.
CPC .......... *G11B 5/255* (2013.01); *G11B 5/00821* (2013.01); *G11B 5/3106* (2013.01);
(Continued)

(58) Field of Classification Search
CPC ............ G11B 2220/00; G11B 2220/91; G11B 2220/913; G11B 5550/916; G11B 2220/90
(Continued)

(56) References Cited

U.S. PATENT DOCUMENTS 3,827,699 A * 8/1974 Waugh .................... G11B 5/41
15/210.1
4,167,725 A 9/1979 Shimizu et al.
(Continued)

FOREIGN PATENT DOCUMENTS

JP S60147916 A 8/1985
JP H04298841 A 10/1992
(Continued)

OTHER PUBLICATIONS

Final Office Action from U.S. Appl. No. 14/576,090, dated Oct. 7, 2015.
(Continued)

*Primary Examiner* — Tabassom Tadayyon Eslami
(74) *Attorney, Agent, or Firm* — Zilka-Kotab, P.C.

(57) ABSTRACT

A product according to one embodiment includes a tape having an applicator portion for applying an organic coating to a magnetic head; the organic coating on the applicator portion of the tape; and a lubricant on a data portion of the tape. The lubricant has a different composition than the organic coating. A method for protecting a magnetic head according to one embodiment includes applying an organic coating to a magnetic head using the foregoing product.

19 Claims, 9 Drawing Sheets

Related U.S. Application Data division of application No. 12/115,449, filed on May 5, 2008, now Pat. No. 8,318,242.

(51) Int. Cl.
*G11B 5/31* (2006.01)
*G11B 5/40* (2006.01)
*G11B 5/41* (2006.01)
*G11B 23/00* (2006.01)

(52) U.S. Cl.
CPC .............. *G11B 5/3113* (2013.01); *G11B 5/40* (2013.01); *G11B 5/41* (2013.01); *G11B 23/0071* (2013.01)

(58) Field of Classification Search
USPC ............... 427/127, 128, 129, 130, 131, 132; 360/134
See application file for complete search history.

(56) References Cited

U.S. PATENT DOCUMENTS

| | | | |
|---|---|---|---|
| 4,422,119 | A | 12/1983 | Kawakami et al. |
| 4,467,382 | A | 8/1984 | Huisman |
| 4,522,885 | A | 6/1985 | Funahashi et al. |
| 4,928,189 | A * | 5/1990 | Siddiq .................. G11B 5/1871 360/128 |
| 5,023,738 | A | 6/1991 | Prenosil |
| 5,023,739 | A | 6/1991 | Shinohara et al. |
| 5,188,747 | A | 2/1993 | Kai et al. |
| 5,327,315 | A | 7/1994 | Nouchi et al. |
| 5,431,833 | A | 7/1995 | Kondo et al. |
| 5,463,519 | A | 10/1995 | Dodt et al. |
| 5,591,481 | A | 1/1997 | Takahashi et al. |
| 5,638,236 | A | 6/1997 | Scott |
| 5,729,398 | A | 3/1998 | Nouchi et al. |
| 6,067,212 | A | 5/2000 | Poorman |
| 6,166,881 | A | 12/2000 | Anderson et al. |
| 6,215,618 | B1 | 4/2001 | Anderson et al. |
| 6,587,307 | B1 | 7/2003 | Raymond et al. |
| 6,940,692 | B2 | 9/2005 | Dai et al. |
| 7,551,385 | B2 | 6/2009 | Biskeborn et al. |
| 7,656,602 | B2 | 2/2010 | Iben et al. |
| 8,291,388 | B2 | 10/2012 | Golan et al. |
| 8,318,242 | B2 | 11/2012 | Bradshaw et al. |
| 9,159,341 | B2 * | 10/2015 | Bradshaw .......... G11B 5/00821 |
| 9,324,343 | B2 * | 4/2016 | Bradshaw .......... G11B 5/00821 |
| 2002/0090536 | A1 | 7/2002 | Dai et al. |
| 2004/0018388 | A1 | 1/2004 | Kitamura et al. |
| 2006/0292402 | A1 * | 12/2006 | Ide ........................ G11B 5/738 428/840.5 |
| 2007/0141400 | A1 | 6/2007 | Marinero |
| 2008/0231992 | A1 | 9/2008 | Cheng et al. |
| 2009/0273857 | A1 * | 11/2009 | Iben ..................... G11B 5/3106 360/97.12 |
| 2009/0274836 | A1 * | 11/2009 | Bradshaw .......... G11B 5/00821 427/127 |
| 2013/0027811 | A1 * | 1/2013 | Bradshaw .......... G11B 5/00821 360/128 |
| 2015/0103441 | A1 | 4/2015 | Bradshaw et al. |
| 2016/0232926 | A1 | 8/2016 | Bradshaw et al. |
| 2018/0040340 | A1 | 2/2018 | Bradshaw et al. |

FOREIGN PATENT DOCUMENTS

| | | | |
|---|---|---|---|
| JP | 09251607 | A | 9/1997 |
| JP | 2000011342 | * | 1/2000 |
| JP | 2000011342 | A | 1/2000 |
| JP | 04298841 | B2 | 7/2009 |

OTHER PUBLICATIONS

Statement of Relevance of Non-Translated Foreign Document: JPS60147916.
Statement of Relevance of Non-Translated Foreign Document: JPH04298841.
Bradshaw et al., U.S. Appl. No. 12/115,449, filed May 5, 2008.
Bradshaw et al., U.S. Appl. No. 13/647,210, filed Oct. 8, 2012.
Bradshaw et al., U.S. Appl. No. 14/576,090, filed Dec. 18, 2014.
Final Office Action from U.S. Appl. No. 13/647,210, dated Mar. 23, 2015.
Iben et al., U.S. Appl. No. 12/166,132, filed Jul. 1, 2008.
Non-Final Office Action from U.S. Appl. No. 12/115,449, dated Apr. 5, 2012.
Non-Final Office Action from U.S. Appl. No. 12/115,449, dated Sep. 19, 2011.
Non-Final Office Action from U.S. Appl. No. 13/647,210, dated Oct. 8, 2014.
Non-Final Office Action from U.S. Appl. No. 14/576,090, dated Feb. 27, 2015.
Notice of Allowance from U.S. Appl. No. 12/115,449, dated Jul. 18, 2012.
Notice of Allowance from U.S. Appl. No. 12/166,132, dated Sep. 15, 2009.
Notice of Allowance from U.S. Appl. No. 13/647,210, dated Jun. 5, 2015.
Statement of Relevance of Non-Translated Foreign Documents: JP09251607 and JP04298841.
Advisory Action from U.S. Appl. No. 14/576,090, dated Dec. 16, 2015.
Notice of Allowance from U.S. Appl. No. 15/130,442, dated Jun. 21, 2017.
Notice of Allowance from U.S. Appl. No. 14/576,090, dated Jan. 20, 2016.
Non-Final Office Action from U.S. Appl. No. 15/130,442, dated Apr. 27, 2017.
Bradshaw et al., U.S. Appl. No. 15/130,442, filed Apr. 15, 2016.
Bradshaw et al., U.S. Appl. No. 15/789,782, filed Oct. 20, 2017.
Notice of Allowance from U.S. Appl. No. 15/130,442, dated Oct. 25, 2017.
Non-Final Office Action from U.S. Appl. No. 15/789,782, dated Feb. 5, 2018.

* cited by examiner

PROTECTING A SENSITIVE DEVICE FROM CORROSION

BACKGROUND

The present invention relates to data storage systems, and more particularly, this invention relates to magnetic heads for tape drives, and coatings to prevent corrosion thereon.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally must skive off the air between the tape and the tape bearing surface (TBS) of the head in order to achieve a low spacing between the head sensor and the magnetic coating on the tape. Usually the tape head is designed to minimize the spacing between the head and the tape. The spacing between the magnetic head and the magnetic tape is crucial to minimize signal amplitude decrease from Wallace spacing losses, which increase with increased magnetic recording flux densities. Thus the TBS is in contact with the tape so that the read element is in near contact with the tape to provide effective coupling of the magnetic field from the tape to the read element. The Wallace spacing is, among other factors, due to asperities on the tape and to erosion of the sensor due to wear. Build up of non-magnetic material between the sensor and the tape magnetic coating can also cause Wallace spacing. Corrosion or oxidation initiated at the TBS of the sensor or the protective poles surrounding the sensor can also lead to Wallace spacing losses.

Further, the AMR, GMR, TMR, etc. sensors usable in tape heads all have a propensity for corrosion. Corrosion or oxidation of the sensor at the TBS can result in surface oxidation of the sensor metals which result in an increase in the spacing between the magnetically active portion of the sensor and the magnetic coating on the tape. High level corrosion can completely destroy the magnetic response of the sensor. One proposed solution is to recess the sensor and apply a hard protective overcoat, e.g., of alumina. However, such materials are in contact with the tape, and tend to wear away, thereby leaving the sensor unprotected. The methods of depositing the hard protective coatings require large expensive tools which preclude the reapplication of a hard coating once it has been worn off. Further, such recession results in Wallace spacing signal losses, which are exacerbated the higher the density of the recorded data on the media.

For tape heads, sensors can be recessed and flux guided, but flux guides have not worked well due to head processing difficulty and to spacing loss.

Alternatively, GMR heads may be fabricated using materials that have improved corrosion resistance, but these materials may not provide optimal magnetic performance (amplitude in particular).

Head-media stiction is usually addressed by making the media rougher, but this may adversely affect the signal-to-noise ratio and thus detection capability and ultimately areal density.

BRIEF SUMMARY

A product according to one embodiment includes a tape having an applicator portion for applying an organic coating to a magnetic head; the organic coating on the applicator portion of the tape; and a lubricant on a data portion of the tape. The lubricant has a different composition than the organic coating.

A method for protecting a magnetic head according to one embodiment includes applying an organic coating to a magnetic head using the foregoing product.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of tape-based storage systems, as well as operation and/or component parts thereof.

In one general embodiment, a method for protecting a magnetic head comprises applying an organic coating to a magnetic head for reducing exposure of the head to oxidation promoting materials, and storing the magnetic head.

In another general embodiment, a method for protecting a magnetic head of a magnetic storage system comprises applying an organic coating to a magnetic head for reducing exposure of the head to oxidation promoting or corrosive materials, the organic coating being applied to the magnetic head after the head is installed in the magnetic storage system. The coating also reduces the exposure of the head to moisture ($H_2O$) which is an essential molecule to promote corrosion.

In another general embodiment, a method comprises fabricating a tape having an applicator portion for applying an organic coating to a magnetic head for reducing exposure of the head to oxidation promoting or corrosive materials, applying the organic coating to the applicator portion of the tape, and applying a lubricant to a data portion of the tape.

In yet another general embodiment, a method comprises fabricating a tape having a data portion and a cleaning portion for removing an organic coating from a magnetic head.

Figure 1:
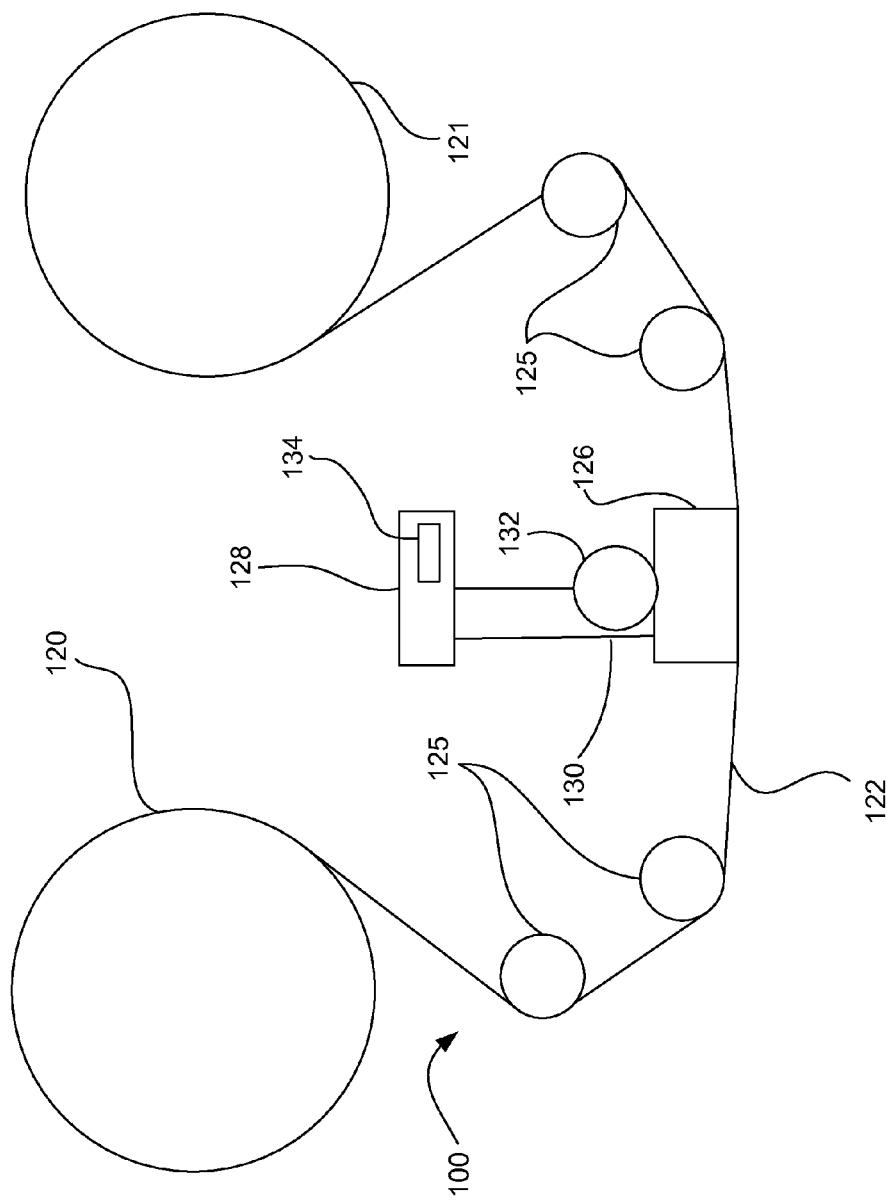
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
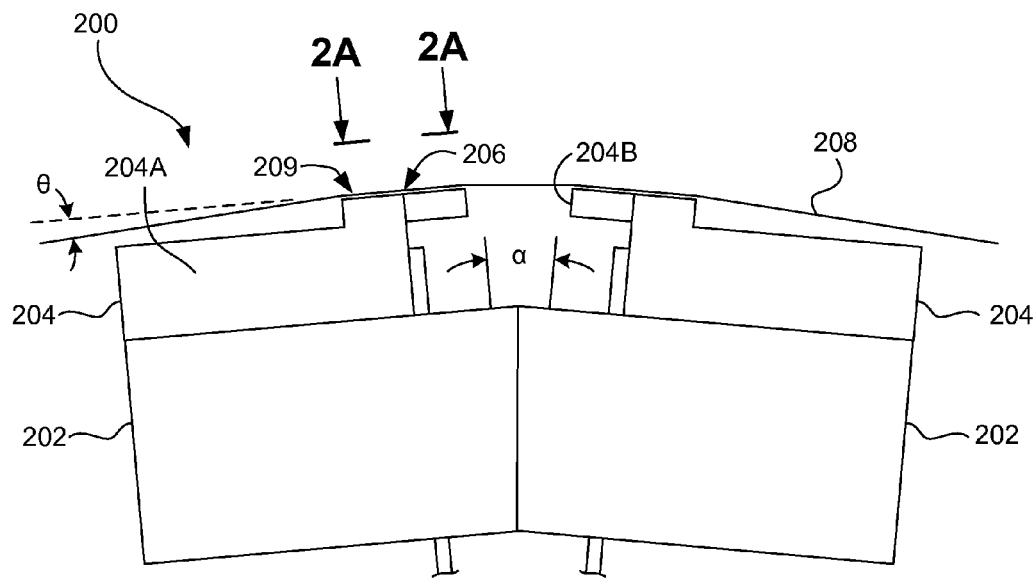
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
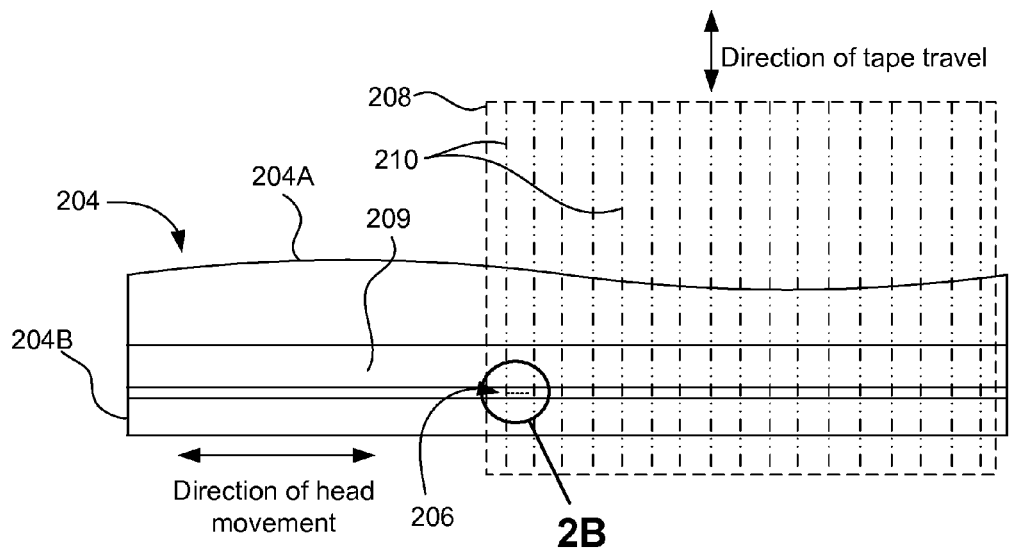
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 12-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2B:
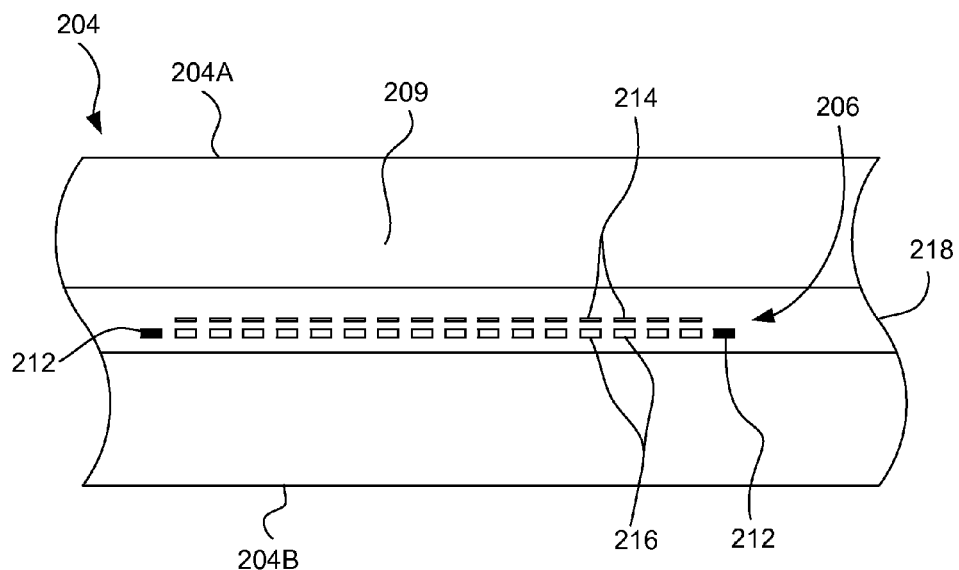
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 40 elements per array 206. A preferred embodiment includes 16 readers per array and/or 16 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
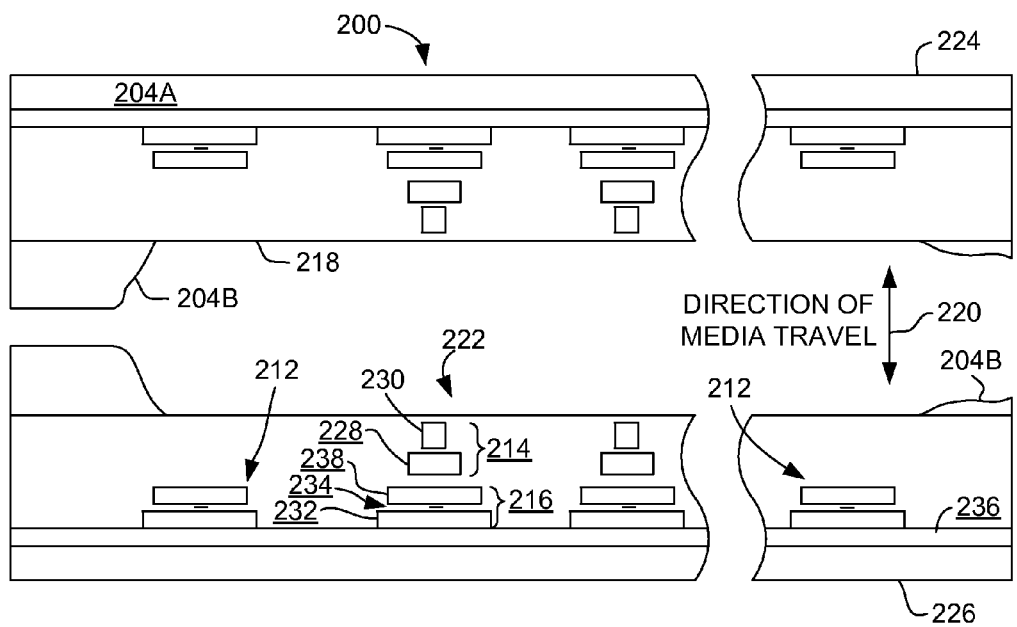
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Magnetoresistive (MR) sensors, such as AMR, GMR and TMR are multi-layer metals, which include, among other metals and alloys: NiFe alloys, Cu, Ru, Co, CoFe alloys, PtMn alloys, IrMn alloys, as well as others. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
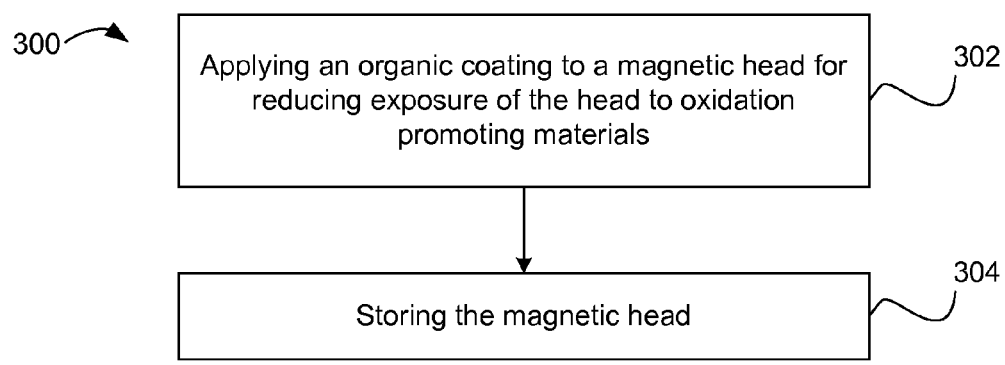
FIG. 3 is a flow diagram of a method according to one embodiment.

Referring now to FIG. 3, a method 300 for protecting a magnetic head according to one embodiment is described. As an option, the present method 300 may be implemented in the context of the functionality and architecture of FIGS. 1-2C. Of course, however, the method 300 may be carried out in any desired environment. It should also be noted that the aforementioned definitions may apply during the present description.

In operation 302, an organic coating is applied to a magnetic head for reducing exposure of the head to oxidation promoting materials, such as water, oxygen, chlorine, bromine, sulfur, sulfides, dihydrogen sulfide, sulfur dioxide, nitrogen dioxide, and other corrosive contaminants.

The coating may be formed of virtually any protective material. Illustrative materials of which the coating may be comprised include squalane, butyl stearate, paraffins, polyvinyl chlorides, polyfluorinated films, polyvinylidene fluorides, fatty acid esters, polyurethanes, etc.

In another embodiment, the coating may comprise a tape lubricant, which may be applied separately or come from a portion of the tape such as the leading portion, trailing portion, or middle portion of the tape. In such an embodiment, the amount of tape lubricant present on the portion of the tape is preferably in excess of what is present on the other portion(s) of the tape so as to apply an amount effective to minimize or prevent corrosion.

As alluded to above, the coating may be applied to the magnetic head by a tape. In one approach, the tape may have a portion that is designed to apply the coating as it is run over the head, preferably while the tape is engaged with the head in a tape drive system, feeding the tape from a tape supply cartridge, possibly shown as tape supply cartridge 120 in FIG. 1. This tape may be designed to be used with standard tape drive systems, and may be loaded on a standard size tape supply cartridge.

Figure 7A:
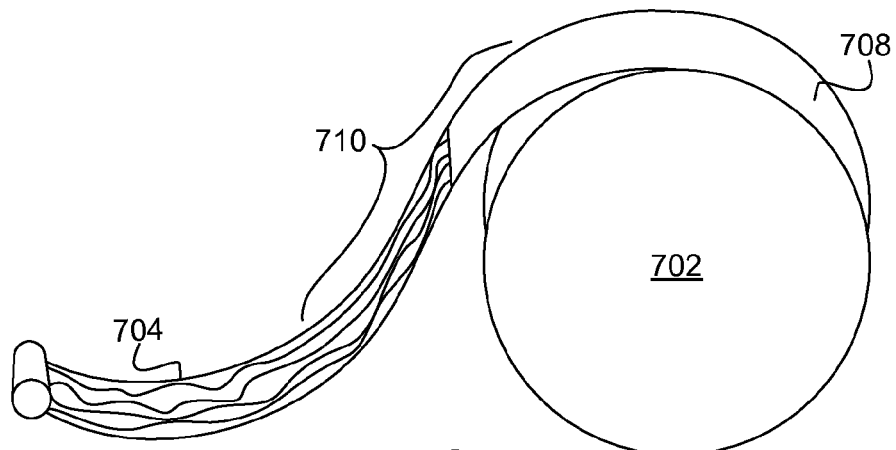
FIG. 7A is a schematic diagram of a tape portion including an applicator portion according to one embodiment.

In another approach, the tape that applies the coating to the magnetic head may include an applicator portion and a data portion. FIG. 7A shows one possible tape with applicator portion approach according to one embodiment. In this embodiment, the tape 710 has a data portion 708 and may be used as a normal data tape, but also may apply the protective coating prior to, after, or in between normal operations as a data tape. Also, the coating may be applied on a routine basis using the applicator portion 704, such as after a preset head running time, after a tape head traverse distance is reached (the total distance that the tape 710 has traveled over the head in both directions), etc. In addition, the applicator portion 704 may comprise less magnetic portion of the tape 710 relative to the data portion 708.

In another approach, the coating is applied to the magnetic head, and after a period of inactivity. Prior to using the magnetic head, the coating is preferably removed. Removal of the coating prior to use on tape, though may not be necessary, as the tape may rub the coating off and the additional magnetic spacing between the sensor and the magnetic coating of the tape may be low enough as to not substantially degrade the performance of the head. This can be useful, for example, if the magnetic head will be stored, shipped, or subject to conditions that might include oxidization promoting or corrosive materials, such as water, oxygen, chorine, and other contaminants, etc. Prior to use, the coating may be removed by a cleaning portion on a tape which is adapted to remove the coating. By "removed" what is meant is that a significant portion of the coating is detached from the head, such as at least 10%, at least 25%, at least 50%, etc. Further, the coating may be completely removed. Once the coating is removed, the head may be used to read and write magnetic data to the tape. After operation of the magnetic head is suspended, another coating may be applied by running a tape across the head, the tape including an applicator portion. Alternatively, other approaches for applying the coating may be used.

Figure 7B:
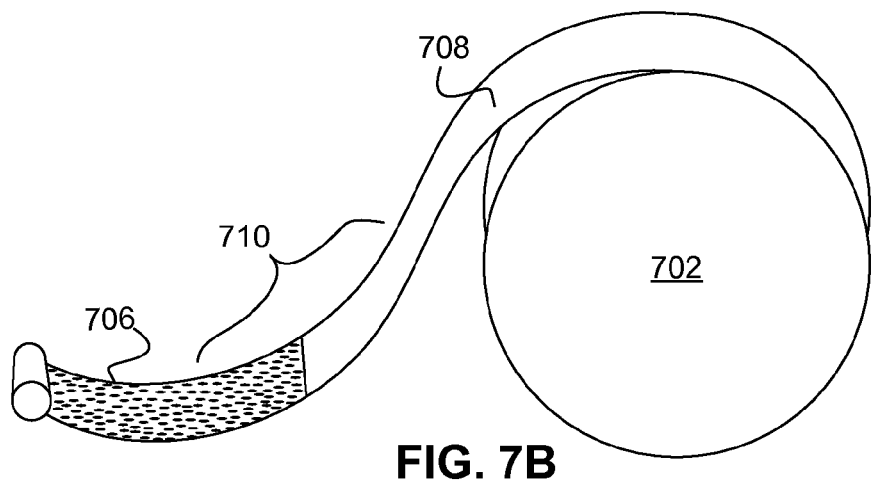
FIG. 7B is a schematic diagram of a tape portion including a cleaning portion according to one embodiment.

In yet another approach, the tape includes a cleaning portion and a data portion. FIG. 7B shows one possible tape with cleaning portion approach according to one embodiment. The cleaning portion 706 may comprise less magnetic material than the data portion 708. The cleaning portion 706 may be on the leading portion of the tape 710, as shown in FIG. 7B, or it may be on the back portion of the tape 710, so that the tape 710 must be unwound from the tape supply cartridge 702 before the cleaning portion 706 is reached. The cleaning portion 706 may also be included somewhere in the middle of the tape 710, or in several locations in the middle of the tape 710. The cleaning portion 706 may also be located in some or all of these locations on the same tape 710.

Figure 7C:
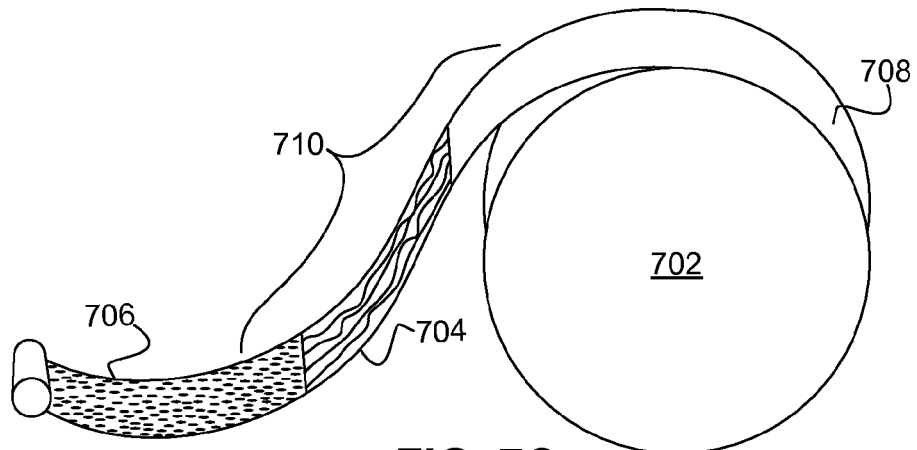
FIG. 7C is a schematic diagram of a tape portion including an applicator portion and a cleaning portion according to one embodiment.

In another approach, the magnetic tape 710 may comprise a cleaning portion 706 for removing a coating from a head, an applicator portion 704 for applying a coating to a head, and a data portion 708, as shown in FIG. 7C.

Another approach may use an applicator to apply the coating, such as a brush, stamp pad, web, nonwoven material, dropper, injector, etc. The applicator may be comprised of any suitable material. Illustrative materials include fabric, impregnated rubber, foam, etc.

Figure 8A:
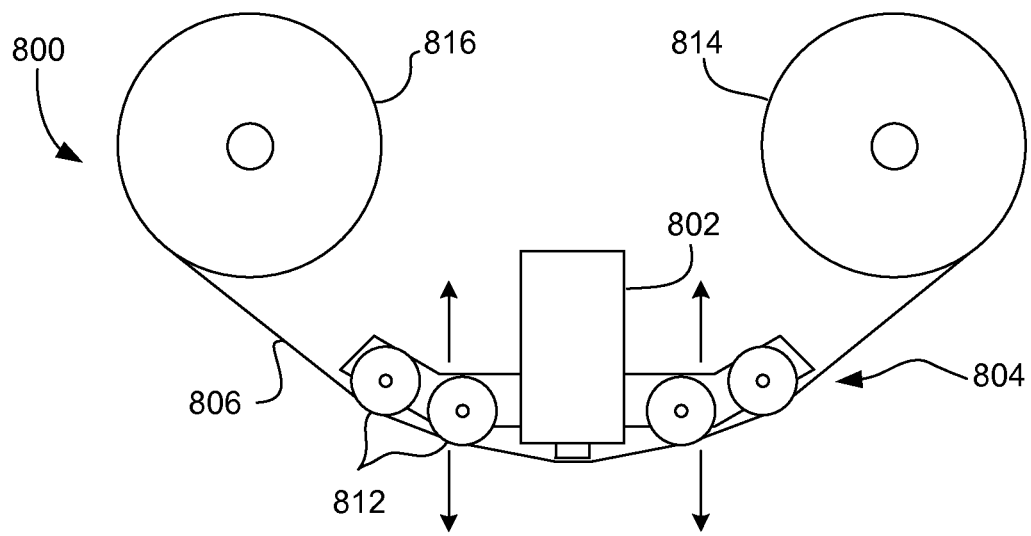
FIG. 8A is a simplified side view drawing of a tape drive system with a tape engaging the head.
Figure 8B:
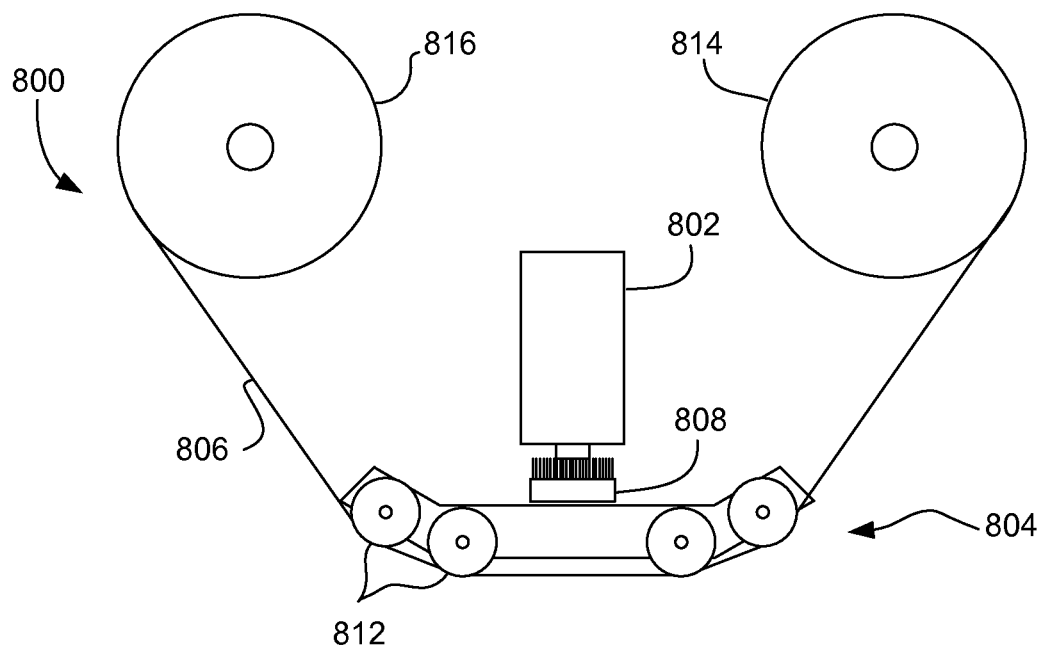
FIG. 8B is a simplified side view drawing of a tape drive system with a tape spaced from the head and an applicator engaging the head.

In another embodiment, as shown in FIG. 8B, the applicator 808 may be present in a drive or magnetic storage system 800 in which the magnetic head 802 resides. Also, the applicator may rub across the magnetic head.

In another embodiment, the applicator which is present in a drive in which the magnetic head resides presses against the magnetic head without substantial wiping. For example, the applicator stamps the magnetic head with a minimum amount of wiping, e.g., wipes less than ½ the width of the tape bearing surface measured perpendicular to the direction of media travel thereacross.

In operation 304, the magnetic head is stored. The head may be stored for many reasons such as prior to assembly in a tape drive system, after assembly and before shipment, after shipment but before use, etc. The coating may also be applied to the magnetic head during building or during packaging (e.g., for shipping, storage, or sale), or during both building and packaging of a drive in which the magnetic head resides to protect the head from corrosion promoting materials.

Figure 4:
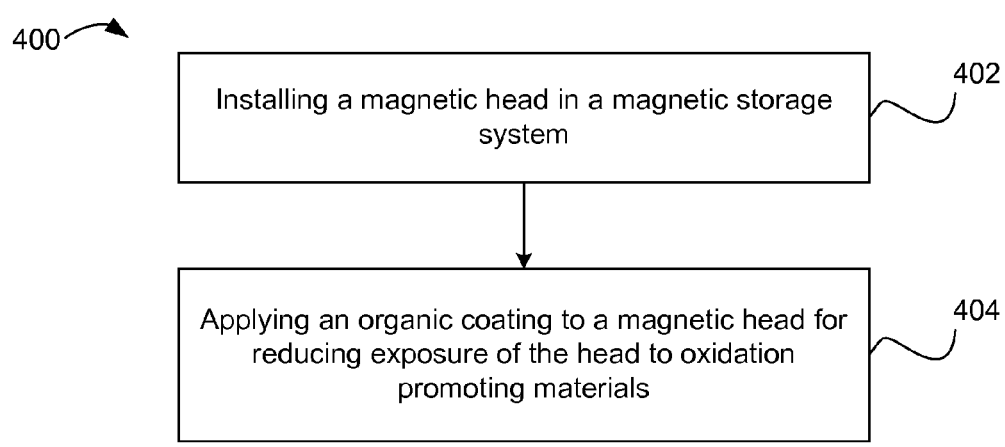
FIG. 4 is a flow diagram of a method according to one embodiment.

FIG. 4 illustrates a method 400 for protecting a magnetic head of a magnetic storage system according to another embodiment. As an option, the present method 400 may be implemented in the context of the functionality and architecture of FIGS. 1-3. Of course, however, the method 400 may be carried out in any desired environment. It should also be noted that the aforementioned definitions may apply during the present description.

In operation 402, a magnetic head is installed in a magnetic storage system. FIG. 8A is an exemplary drawing of a magnetic storage system 800 which has a magnetic head 802 already installed.

In operation 404, an organic coating is applied to a magnetic head for reducing exposure of the head to oxidation promoting materials such as water, oxygen, contaminants, etc.

In one particularly preferred embodiment, the coating may be comprised of a material selected from a group consisting of squalane, butyl stearate, a paraffin, a polyvinyl chloride, a polyfluorinated film, a polyvinylidene fluoride, a fatty acid ester, and a polyurethane.

In another embodiment, the coating may comprise a tape lubricant, which may be applied separately or come from a portion of a tape such as the leading portion, trailing portion, or middle portion of the tape.

Figure 5:
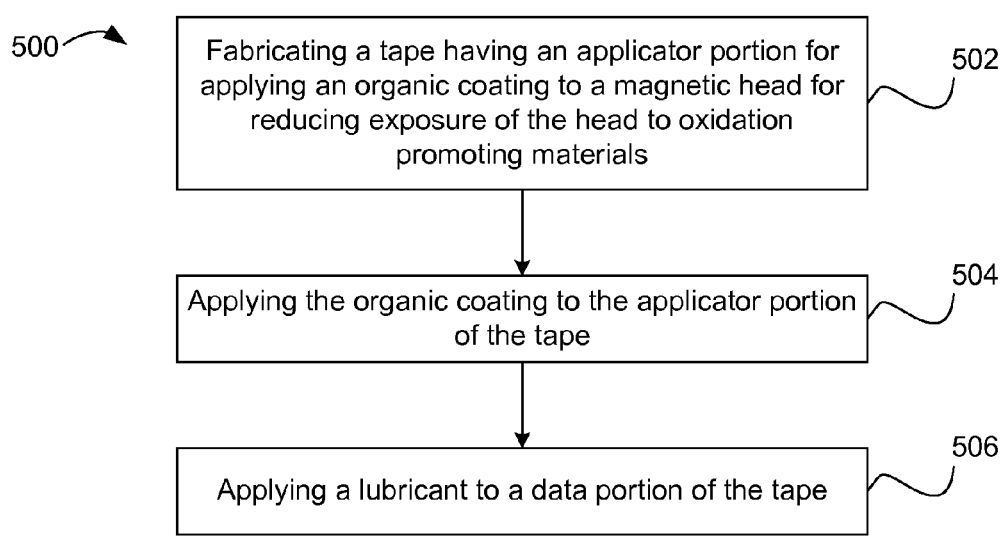
FIG. 5 is a flow diagram of a method according to one embodiment.

FIG. 5 illustrates a method 500 according to another embodiment. As an option, the present method 500 may be implemented in the context of the functionality and architecture of FIGS. 1-4. Of course, however, the method 500 may be carried out in any desired environment. It should also be noted that the aforementioned definitions may apply during the present description.

In operation 502, a tape is fabricated having an applicator portion for applying an organic coating to a magnetic head for reducing exposure of the head to oxidation promoting materials such as water, oxygen, contaminants, etc.

In operation 504, the organic coating is applied to the applicator portion of the tape. This organic coating is then capable of being applied to a head to protect the head from oxidation promoting materials.

In operation 506, a lubricant is applied to a data portion of the tape. This lubricant can enable the data portion of the tape to run more smoothly over a head.

In one particularly preferred embodiment, the coating may be comprised of a material selected from a group consisting of squalane, butyl stearate, a paraffin, a polyvinyl chloride, a polyfluorinated film, a polyvinylidene fluoride, a fatty acid ester, and a polyurethane.

In another approach, the tape may include at least one of a data portion, an applicator portion, and a cleaning portion.

In another embodiment, the lubricant has a different composition than the coating.

Figure 6:
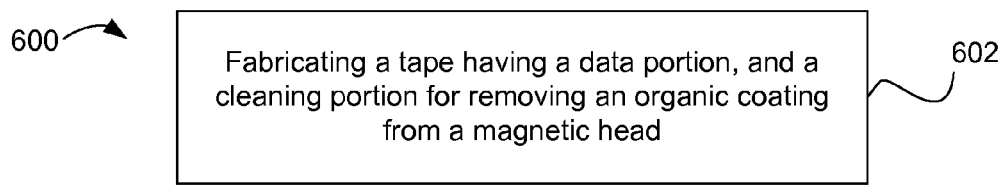
FIG. 6 is a flow diagram of a method according to one embodiment.

FIG. 6 illustrates a method 600 according to another embodiment. As an option, the present method 600 may be implemented in the context of the functionality and architecture of FIGS. 1-5. Of course, however, the method 600 may be carried out in any desired environment. It should also be noted that the aforementioned definitions may apply during the present description.

In operation 602, a tape is fabricated having a data portion and a cleaning portion for removing an organic coating from a magnetic head. FIG. 7B shows one embodiment of a tape fabricated according to the method 600.

In one embodiment, the tape is a data tape which has an extended leader portion that can rub the coating off the head prior to using the tape as a data tape.

In another embodiment, the tape is a special tape with a leader specially designed to remove the coating from the head when the tape is loaded onto the tape drive system. In this embodiment, the tape may then have an applicator portion which can reapply the coating to the head when the tape is unloaded from the tape drive system. A tape may have both a cleaning leader portion and an applicator portion to remove the coating from a head when loaded, and reapply the coating to a head when unloaded.

FIG. 7A shows a tape 710 having an applicator portion 704 for applying a coating to a magnetic head for protecting the head from corrosion promoting materials such as water, oxygen, contaminants, etc., according to one embodiment. The tape 710 is housed on a tape supply cartridge 702 and may include a data portion 708 in addition to the applicator portion 704. Although the applicator portion 704 is shown on the leading portion of the tape 710, it may be present at other locations such as in the middle of the tape 710, at the end of the tape 710, in the middle of the tape 710, or at multiple locations on the same tape 710.

FIG. 7B shows a tape 710 having a cleaning portion 706 for removing a coating from a magnetic head according to one embodiment. The tape 710 is housed on a tape supply cartridge 702 and may include a data portion 708 in addition to the cleaning portion 706. Although the cleaning portion 706 is shown on the leading portion of the tape 710, it may be present at other locations such as in the middle of the tape 710, at the end of the tape 710, in the middle of the tape 710, or at multiple locations on the same tape 710.

FIG. 7C shows a tape 710 having an applicator portion 704 and a cleaning portion 706 according to one embodiment. The tape 710 is housed on a tape supply cartridge 702 and may include a data portion 708 in addition to the applicator portion 704 and cleaning portion 706. Although the applicator portion 704 and cleaning portion 706 are shown on the leading portion of the tape 710, they may be present at other locations such as in the middle of the tape 710, at the end of the tape 710, in the middle of the tape 710, or at multiple locations on the same tape 710. The portions may also be separated, and do not necessarily appear on the tape 710 in the order shown in FIG. 7C (for example, the applicator portion 704 may be located closer to the leading edge of the tape 710 than the cleaning portion 706).

FIG. 8A is an exemplary diagram of a tape drive system 800. As shown, the system includes a tape head 802, and a guide mechanism 804 for passing a magnetic recording tape 806 over the head. The system 800 is in read and/or write mode in this diagram. During normal operation, the tape 806 is guided from one reel 814, across the head 802 by the guide mechanism 804, and to a second reel 816. The guide mechanism 804 may include guides 812 such as rotational guides (e.g., rollers), nonrotational guides, etc. on one or more sides of the head 802. As shown, the guide mechanism 804 includes four rollers. It should be noted that any type of guide mechanism known in the art can be used in various permutations.

In one example, the guide mechanism 804 includes at least one guide 812 that moves away from the head 802 to create the relative spacing between the tape 806 and the head 802 as indicated by the arrows.

FIG. 8B illustrates one embodiment of a system that may use one of the methods. During an applying operation, while the tape 806 is adjacent the head 802, a relative spacing between the tape 806 and the head 802 is created before the applicator 808 applies the coating to the head 802. Such a relative spacing is shown in FIG. 8B, and an illustrative position of the applicator 808 when inserted into the spacing.

Preferably, the applicator 808 does not contact the tape 806 during coating application to the head 802, though contact might occur in some embodiments. Non-contact embodiments are preferred so as to avoid any applicator-induced damage to the tape 806 that could otherwise occur. The tape surface is susceptible to scratching damage, and so the tape head 802 is fabricated with smooth surfaces, and generally no abrupt discontinuities that might scratch the tape 806. It follows that an object (not part of the guide mechanism) engaging the tape 806 should also be at least as smooth as the head 802. In addition, there is less chance of debris being transferred from the applicator 808 to the tape 806 if there is no contact therewith.

Figure 9A:
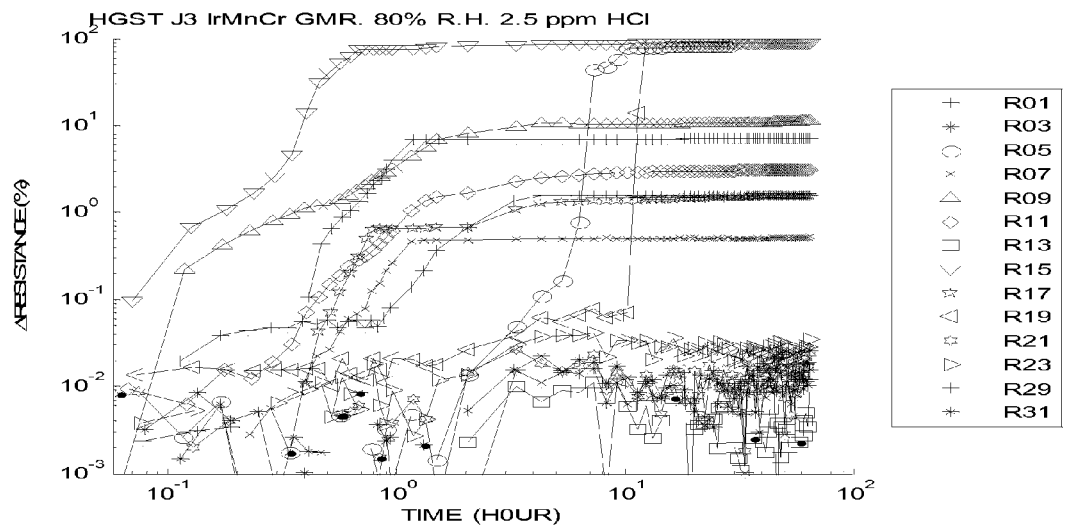
FIG. 9A is a chart of corrosive effects on an uncoated 16-channel head subjected to a corrosive environment, plotting change in resistance (in %) versus time elapsed (in hours).
Figure 9B:
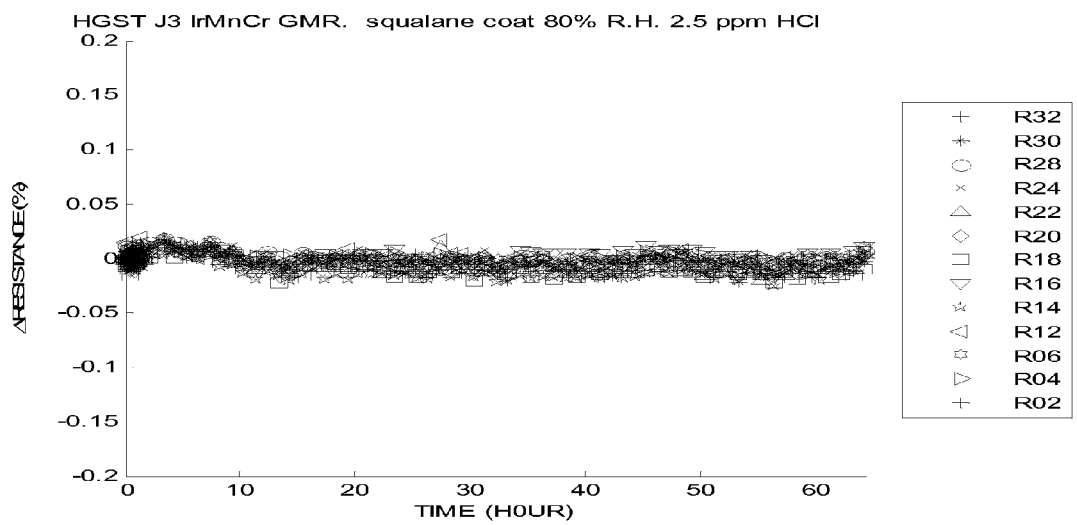
FIG. 9B is a chart of corrosive effects on a 16-channel head coated with squalane subjected to a corrosive environment, plotting change in resistance (in %) versus time elapsed (in hours).
Figure 9C:
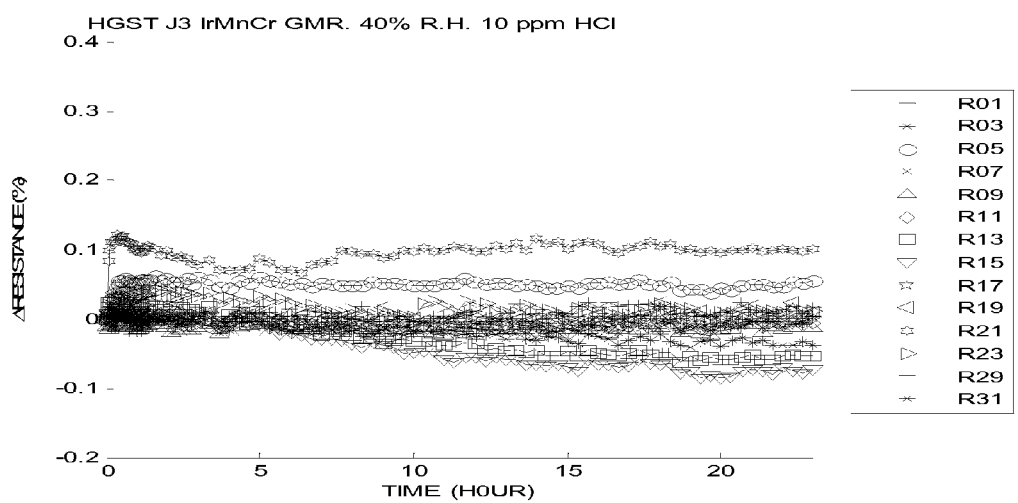
FIG. 9C is a chart of corrosive effects on a 16-channel head coated with squalane subjected to a more corrosive environment, plotting change in resistance (in %) versus time elapsed (in hours).

FIGS. 9A-9C are charts displaying results of experiments conducted on 16-channel heads with and without coatings in different atmospheric conditions. Temperature effects on the resistance of the readers was not accounted for in the measurements.

FIG. 9A is a chart of an uncoated 16-channel GMR head in a static chamber at about 20° C. and about 80% relative humidity (RH) with about 2.5 parts per million (ppm) Hydrogen Chloride (HCl). The resistances of 14 of the 16 readers are measured at consistent time intervals after a baseline is established by letting the resistance normalize after a few hours in the chamber at 80% RH. Then, the air atmosphere in the chamber is altered so that it becomes about 2.5 ppm HCl. The change in resistance (in %) is on the y-axis versus the time elapsed in the chamber (in hours) on the x-axis. The change in resistance is determined by dividing the current resistance measured by the baseline resistance measured after normalization. The legend on the right of the chart indicates the reader number for each of the readers tested (all readers on this 16-channel head were tested except for R25 and R27). As this chart shows, when exposed to a corrosive environment, the resistances of the readers change drastically and unpredictably. This indicates that the head experienced corrosion due to exposure to the corrosive environment.

FIG. 9B is a chart of a 16-channel GMR head coated with squalane in a static chamber at about 20° C. and about 80% RH with about 2.5 ppm HCl. The resistances of 13 of the 16 readers are measured at consistent time intervals after a baseline is established by letting the resistance normalize after a few hours in the chamber at 80% RH. Then, the atmosphere in the chamber is altered so that it becomes about 2.5 ppm HCl. The change in resistance (in %) is on the y-axis versus the time elapsed in the chamber (in hours) on the x-axis. According to the legend on the right of the chart, all readers on this 16-channel head were tested except for R26, R10 and R08. As this chart shows, when exposed to a corrosive environment, the readers coated with squalane experienced very little resistance change over the 60 hours of exposure to the corrosive environment. This indicates that the head experienced little or no corrosion over the testing period. When removed from the testing chamber, no corrosion was observed.

In FIG. 9C, the environment was made even more corrosive by increasing the concentration of HCl to about 10 ppm. Here, a 16-channel GMR head coated with squalane was placed in a static chamber at about 21° C. and about 40% RH with about 10 ppm HCl. The resistances of 14 of the 16 readers are measured at consistent time intervals after a baseline was established by letting the resistance normalize after a few hours in the chamber at 40% RH. Then, the atmosphere in the chamber was altered so that it becomes about 10 ppm HCl. The change in resistance (in %) is on the y-axis versus the time elapsed in the chamber (in hours) on the x-axis. According to the legend on the right of the chart, all readers on this 16-channel head were tested except for R25 and R27. As this chart shows, when exposed to a more corrosive environment than in the test shown in FIG. 9A, the readers coated with squalane experienced very little resistance change over the approximately 25 hours of exposure to the more corrosive environment. This indicates that the head experienced little or no corrosion over the testing period. When removed from the testing chamber, no corrosion was observed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A product, comprising:
   a tape having an applicator portion positioned along a different portion of a length of the tape than a data portion of the tape,
   the applicator portion being for coating a tape bearing surface of a magnetic head with an organic coating;
   the organic coating only on the applicator portion of the tape, wherein the organic coating remains on the magnetic head upon application thereof; and
   a lubricant on the data portion of the tape, wherein the lubricant has a different composition than the organic coating.

2. The product as recited in claim 1, wherein the applicator portion comprises less magnetic material than the data portion.

3. The product as recited in claim 2, wherein the applicator portion comprises at least some magnetic material.

4. The product as recited in claim 2, wherein the applicator portion has no magnetic material.

5. The product as recited in claim 1, wherein the tape includes a cleaning portion configured to remove a coating from the head.

6. The product as recited in claim 5, wherein the cleaning portion is positioned closer to a leading end of the tape than the applicator portion.

7. The product as recited in claim 1, further comprising a tape supply cartridge, the tape being wound around the tape supply cartridge.

8. The product as recited in claim 1, wherein the lubricant is only on the data portion of the tape.

9. The product as recited in claim 1, wherein the organic coating protects the magnetic head from oxidation promoting materials.

10. A product, comprising:
a tape having an applicator portion for coating a tape bearing surface of a magnetic head with an organic coating;
the organic coating is only on the applicator portion of the tape, wherein the organic coating is configured to separate from the applicator portion and remain as a coating on the head upon application thereof; and
a lubricant on a magnetic data portion of the tape,
wherein the lubricant has a different composition than the organic coating.

11. The product as recited in claim 10, wherein the applicator portion comprises less magnetic material than the data portion.

12. The product as recited in claim 11, wherein the applicator portion comprises at least some magnetic material.

13. The product as recited in claim 11, wherein the applicator portion has no magnetic material.

14. The product as recited in claim 10, wherein the tape includes a cleaning portion configured to remove the organic coating from the head.

15. The product as recited in claim 14, wherein the cleaning portion is positioned closer to a leading end of the tape than the applicator portion.

16. The product as recited in claim 10, further comprising a tape supply cartridge, the tape being wound around the tape supply cartridge.

17. The product as recited in claim 10, wherein the lubricant is only on the data portion of the tape.

18. The product as recited in claim 10, wherein the organic coating protects the magnetic head from oxidation promoting materials.

19. The product as recited in claim 14, wherein the cleaning portion removes the organic coating from the head when the tape is loaded onto a tape drive system.

* * * * *